United States Patent [19]

Miller et al.

[11] Patent Number: 5,784,251

[45] Date of Patent: Jul. 21, 1998

[54] APPLIANCE CHASSIS HAVING HINGEDLY MOUNTED SECTION

[75] Inventors: Wayne H. Miller, West Linn, Oreg.; Jimmy A. Melton, San Jose; Wayman Lee, Santa Clara, both of Calif.; Bradley C. Helm, Tualatin, Oreg.; David H. Titzler, Newbury Park, Calif.

[73] Assignee: Apple Computer, Inc., Cupertino, Calif.

[21] Appl. No.: 431,417

[22] Filed: May 1, 1995

[51] Int. Cl.[6] ............................ G06F 1/16; H05K 7/16
[52] U.S. Cl. ............................ 361/683; 361/725
[58] Field of Search ........................ 361/610, 683, 361/684, 685, 686, 724, 725; 364/708.1; G06F 1/16

[56] References Cited

U.S. PATENT DOCUMENTS

| | | | |
|---|---|---|---|
| 4,717,216 | 1/1988 | Hornak | 361/724 |
| 4,728,160 | 3/1988 | Mondor et al. | 361/685 |
| 5,032,952 | 7/1991 | Cooke et al. | 361/747 |
| 5,051,868 | 9/1991 | Leverault et al. | 361/395 |
| 5,172,305 | 12/1992 | DeWilde | 361/725 |
| 5,238,317 | 8/1993 | Böhmer et al. | 400/693 |

FOREIGN PATENT DOCUMENTS

| | | |
|---|---|---|
| 0647897 | 4/1995 | European Pat. Off. |
| 2128353 | 1/1973 | Germany |
| WO 9520785 | 8/1995 | WIPO |

*Primary Examiner*—Lynn D. Feild
*Attorney, Agent, or Firm*—Burns, Doane, Swecker & Mathis, LLP

[57] ABSTRACT

An appliance such as a personal computer includes a metal chassis which comprises a main chassis section and a subchassis hingedly connected to the main chassis section for rotation about a horizontal axis between folded-in and folded-out positions. The subchassis carries operational components such as a power supply and a drive, and the main chassis section carries an operational component such as a motherboard. When the subchassis is in its folded-in position it overlies the motherboard and blocks access thereto, and when in its folded-out position the subchassis provides access to the motherboard. In its folded-in position the subchassis sits upon horizontal edges of the main chassis section.

20 Claims, 4 Drawing Sheets

APPLIANCE CHASSIS HAVING HINGEDLY MOUNTED SECTION

BACKGROUND OF THE INVENTION

The invention relates to electric appliances, such as personal computers, and in particular, to a chassis or enclosure which houses the operational components of the appliance.

A personal computer typically comprises a metallic chassis which houses, and provides EMI shielding for operational components of a computer, such as a motherboard, power supply disc drive, electric cables, plug-in connectors, cooling fan, etc. An outer housing can also be provided which encloses the chassis.

The computer is assembled by installing the operational components within the chassis. The components can be fastened to an outer chassis part and/or to subchassis parts which are, in turn, secured within the main part by a suitable fastening structure, such as screws, clamps, snap-ins, etc.

Before an assembled computer is delivered to an end user, it may become necessary to modify, i.e., reconfigure, the computer by replacing, removing, and/or adding components. Such a procedure can be relatively time consuming. For example, in order to replace the motherboard, appreciable time and effort could be involved in disassembling a number of components and/or subchassis parts located thereabove, and threading cables through holes formed in the chassis parts. The need to reconfigure large numbers of computers in that fashion may involve a considerable number of man-hours and expense.

Therefore, it would be desirable to reduce the time and effort required to reconfigure a personal computer by providing quick and simple access to internal components thereof.

SUMMARY OF THE INVENTION

The present invention relates to a personal computer comprising a chassis including a main chassis section supporting at least a first electric operational component of the computer, and a subchassis supporting at least a second electric operational component of the computer. The subchassis is hingedly mounted for swinging movement relative to the main chassis section about a substantially horizontal axis of rotation between a folded-in position arranged above the first operational component, and a folded-out position offset from the first operational component to provide access thereto.

The main chassis section preferably forms an internal space, with the subchassis disposed within that space when in the folded-in position, and disposed out of the space when in the folded-out position.

The main chassis section and subchassis are preferably formed of metal.

The subchassis could carry a supporting leg which is moveable into a supporting position for supporting the subchassis on a supporting surface when the horizontal subchassis is in a folded-out position.

The main chassis section preferably includes at least one horizontal edge upon which the subchassis sits when in the folded-in position.

At least one releasable latch is preferably provided for retaining the subchassis in its folded-in position.

The subchassis preferably carries a power supply and at least one drive, with the main chassis section carrying a motherboard arranged beneath the subchassis when the subchassis is in the folded-in position.

The subchassis preferably includes a floor having a hole formed therethrough. The power supply is mounted on the floor and includes an electrical cable extending through the hole to be coupled to connectors carried by the motherboard.

There could be more than one subchassis, each hinged about a respective substantially horizontal axis. The subchasses could be arranged to lie next to one another, or above one another, when in their folded-in positions.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION OF PREFERRED EMBODIMENTS OF THE INVENTION

Figure 1:
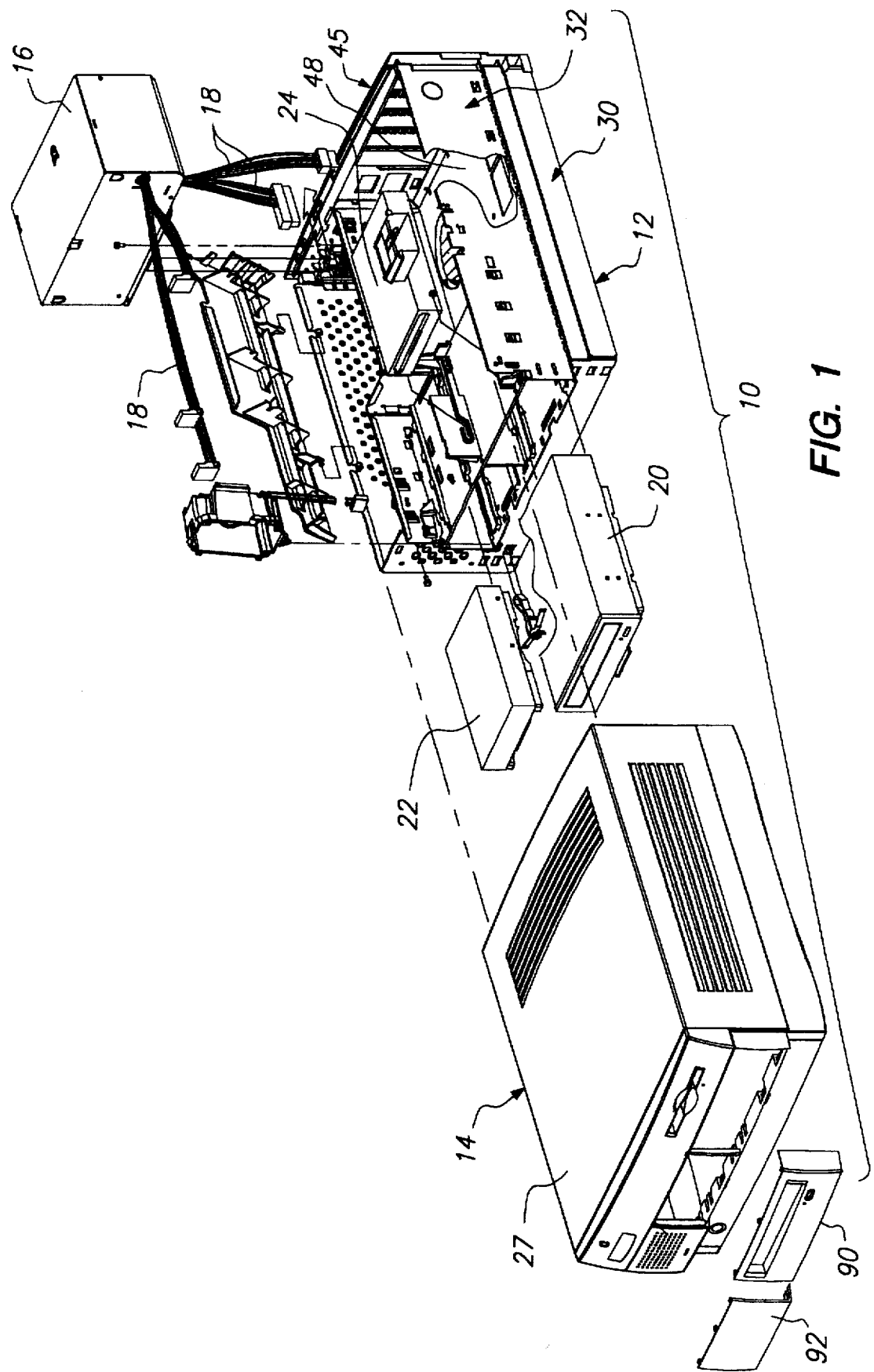
FIG. 1 is an exploded top perspective view of a personal computer according to the present invention.
Figure 2:
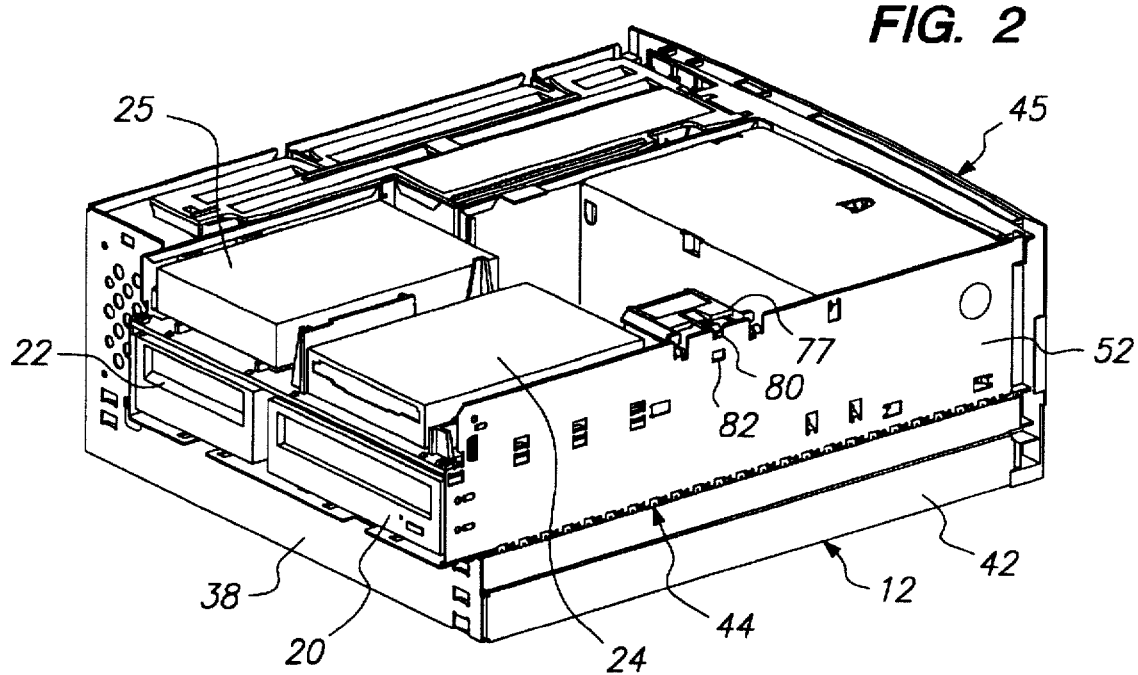
FIG. 2 is a top front perspective view of the chassis with the operational components installed therein, the chassis including a main chassis portion and a subchassis, the subchassis disposed in a folded-in position.
Figure 3:
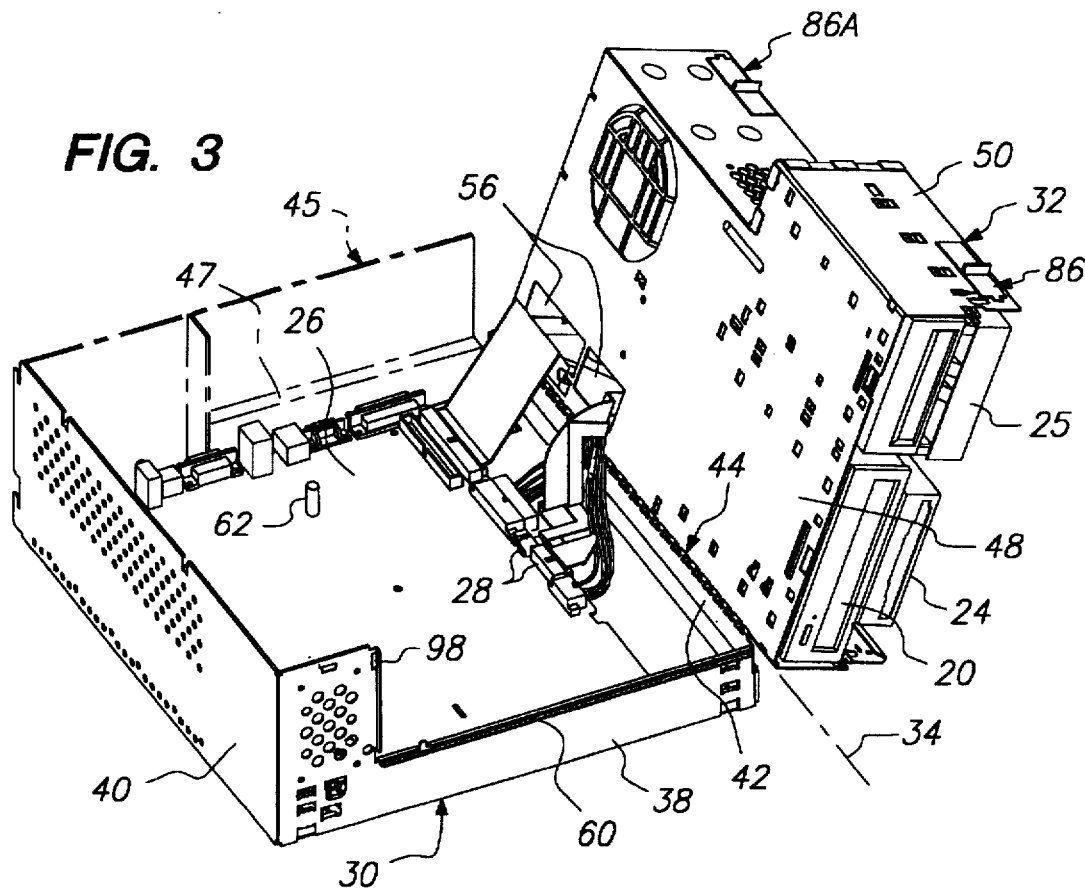
FIG. 3 is a view similar to FIG. 2 with the subchassis in a folded-out position.

Depicted in FIG. 1 is a personal computer 10 comprised of a metal chassis 12 (e.g., steel), an outer housing 14 (e.g., formed of plastic), and electric operational components including a power supply 16 having electric cables 18, a CD ROM 20, a hard drive 22, and a floppy drive 24 for example. Shown in FIG. 2 is another hard drive 25. Depicted in FIG. 3 is a motherboard 26 carrying connectors 28. Cables 18 connect the operational components to the power supply 16. The underside of a top portion 27 of the housing 14 includes a metal plate (not shown) to provide EMI shielding across the top of the chassis.

The chassis 12 comprises a main or outer section 30, and a second section or subchassis 32 hingedly connected to the main section 30 about a horizontal axis of rotation 34 (see FIG. 3). The subchassis 32 carries bays for mounting the hard and floppy disc drives 22, 24, 25, and the CD ROM 20. Also, the power supply 16 having an integral cooling fan is mounted to the subchassis 32. The motherboard 26 is mounted within a space formed by the main chassis section 30.

The main chassis section 30 includes a bottom wall (not shown), a front wall 38 projecting upwardly from the bottom wall, and two side walls 40, 42 also projecting upwardly from the bottom wall. One of the side walls 42 is shorter than the other side wall 40, and is hinged to the subchassis 32 by a hinge structure 44. A rear panel 45 carrying EMI shielding is attached to the rear of the main chassis section 30. That rear panel forms a horizontal ledge or edge 47 located at the same elevation as an upper edge 60 of a portion of the front wall 38. The ledge 47 carries metallic strips for forming EMI shielding.

The subchassis 32 includes a floor 48 and a pair of side walls 50, 52 projecting upwardly from the floor 48. The hinge structure 44 is formed between the side walls 42, 52 to form the axis 34. A preferred method of forming the hinge structure, so that the hinge structure provides an effective EMI shielding, is described in a concurrently filed application Ser. No. 08/431/419 entitled "Method of Forming a Hinge Structure" now U.S. Pat. No. 5,561,893, the disclosure of which is incorporated by reference herein.

The connectors 28 are arranged close to, and parallel to, the hinge 44 to facilitate the swinging of the subchassis to the unfolded position and to minimize the lengths of the cables.

Holes 56 are formed in the floor 48 which admit some of the cables 18 interconnecting the power supply 16 with the connectors 28 of the motherboard 26, as shown in FIG. 3.

The subchassis 32 is swingable between a closed or folded-in position shown in FIG. 2, and an open or folded-out position shown in FIG. 3. In the folded-in position a front portion of the floor 48 rests upon an upper edge 60 of the front wall 38 (thereby creating an EMI shield therebetween), and a rear portion of the floor 48 rests upon the edge 47 of the rear panel 45. This creates a more effective EMI shielding since the weight of the subchassis bears downwardly against those edges. In that regard, the edge 60 is formed of metal, and the edge 47 carries EMI shielding strips of metal, for making electrical contact with the subchassis. It will be appreciated that better electrical contact is achieved if the subchassis is able to bear against the edges 47, 60 with its weight.

Further details of EMI shielding aspects of the computer are provided in concurrently filed application Ser. No. 08/431/419 entitled "Appliance Having EMI Shield".

An intermediate portion of the subchassis rests upon a post 62 which projects upwardly from the motherboard 26. The subchassis 32 thus overlies the motherboard 26 and blocks access thereto.

It will be appreciated that the computer 10 is assembled by installing the motherboard 26 in the main chassis 30, installing the drives 22, 24, 25 and CD ROM 20 in respective bays of the subchassis 32, installing the power supply 16 in the subchassis, and threading some of cables 18 through the holes 56 in the floor 48 and connecting those cables to the respective components, including the power supply 16 which is mounted in the subchassis. FIG. 2 depicts the assembled chassis without front shields which will overlie the drives 20, 22, 24, 25.

In the event that it becomes necessary to reconfigure the thus-assembled computer prior to its being shipped to an end user, e.g., by replacement or reconfiguring of the motherboard, access to the motherboard 26 is achieved easily and quickly by swinging the subchassis 32 upwardly and outwardly about the axis 34 to the folded-out position (see FIG. 3). That is, it is unnecessary to remove the power supply 16, the drives 22, 24, 25 or the CD ROM 20; rather, those components are simply swung along with the subchassis 32. It is also unnecessary to thread the cables through any holes, or disconnect any cables, in order to unfold the subchassis.

Once the motherboard 26 has been replaced or reconfigured, it is merely necessary to swing the subchassis 32 back to the folded-in position shown in FIG. 2.

Figure 4:
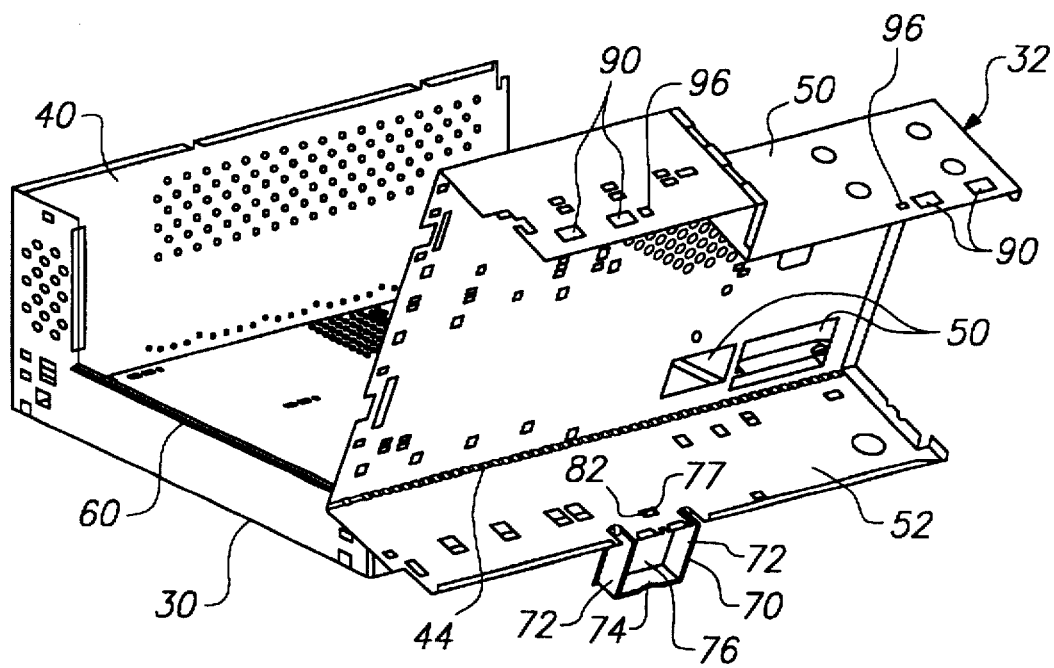
FIG. 4 is a rear top perspective view of the chassis, with the operational components of the computer removed therefrom, and with the subchassis disposed in a folded-out position and supported by a support stand.
Figure 5:
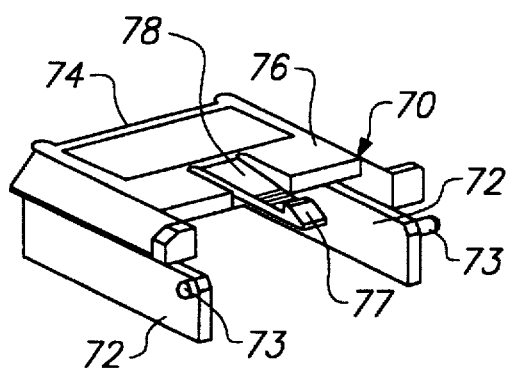
FIG. 5 is a perspective view of the support stand depicted in FIG. 4.

If necessary, a support could be provided for holding the subchassis 32 in the folded-out position. The support comprises a stand 70 shown in FIGS. 4 and 5 and comprises a generally U-shaped member having a pair of legs 72 interconnected by a bight 74. A plate 76 extends across the legs 72 and bight 74. The legs 72 include projections 73 that are pivotably connected to an upper edge of the side wall 52 of the subchassis 32 for rotation about a horizontal axis. When the subchassis 32 is in a folded-in position (FIG. 2), the stand 70 is swung to a storage position located inside of the subchassis 32, and such that a projection 77 of a spring finger 78 that projects from the plate 76, enters a notch 80 formed in a top edge of the side wall 52 as shown in FIG. 2 to yieldably retain the stand in the storage position. When the subchassis 32 is in the folded-out position, the stand 70 is swung to an operative position such that the bight 74 rests upon a support surface, as shown in FIG. 4, and the projection 77 enters a hole 82 formed in the side wall 52, to yieldably retain the stand in its operative position.

Figure 6:
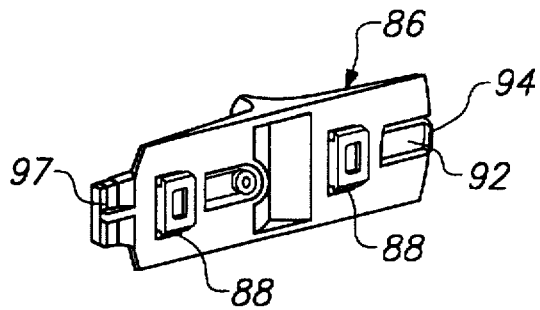
FIG. 6 is a perspective view of a rear side of a latch element depicted in FIG. 3.
Figure 7:
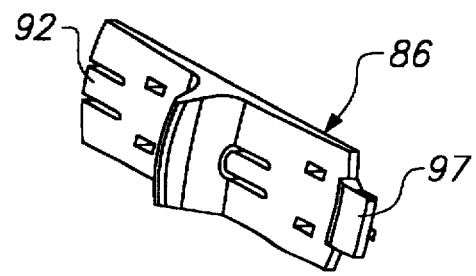
FIG. 7 is a perspective view of a front side of the latch depicted in FIG. 6.

Also, latches are provided for securing the subchassis in the folded-in position. Those latches can comprise front and rear latch elements 86, 86A slidably mounted on the side wall 50 of the subchassis as shown in FIGS. 3, 6 and 7. The front latch element 86 includes a rear side (FIG. 6) having a pair of T-shaped feet 88 arranged to be snapped into respective mounting holes 90 formed in the side wall 50 (see FIG. 4). Each mounting hole 90 is longer in the horizontal direction than is its respective foot 88 to enable the latch to slide horizontally. Projecting from one end of the latch is a spring finger 92 having a projection 94 arranged to snap into a locking hole 96 formed in the side wall 50 when the latch is slid to a latching position. Thus, a releasable (yieldable) connection is established which tends to hold the latch in its latching position.

Projecting from the other end of the latch element is a nose 97 adapted to enter a slot 98 (see FIG. 3) formed in a portion of the front wall 38 of the main chassis section, when the latch element is in a latching position, to prevent the subchassis 32 from being swung upwardly.

The rear latch element 86A is identical to the front latch element 86 and the nose thereof is adapted to enter a slot (not shown) formed in the rear panel.

Figure 8:
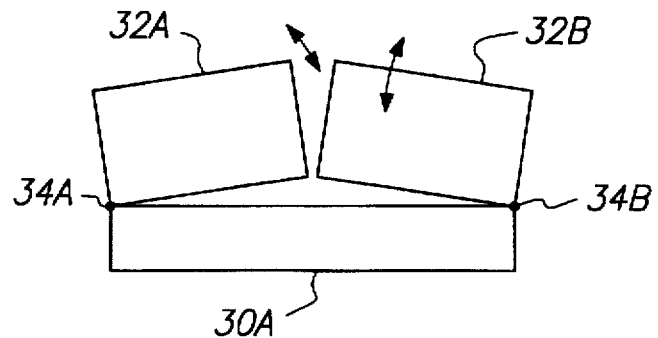
FIGS. 8, 9, and 10 are schematic front elevational views of respective alternative embodiments according to the present invention.

It will be appreciated that the present invention can take numerous forms. For example, instead of a single subchassis 32, there can be provided a plurality of subchassis 32A, 32B as shown in FIG. 8, which are swingable about respective horizontal axes 34A, 34B formed at opposite sides of the main chassis 30A. In the folded-in position, the subchassis 32A, 32B are co-planar, i.e., horizontally side-by-side.

Figure 9:
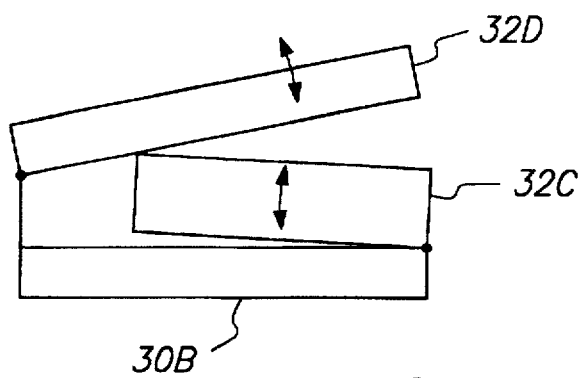

Alternatively, as shown in FIG. 9, the subchassis 32C, 32D could be arranged to sit above and below one another when in the folded-in position on the main chassis 30B.

Figure 10:
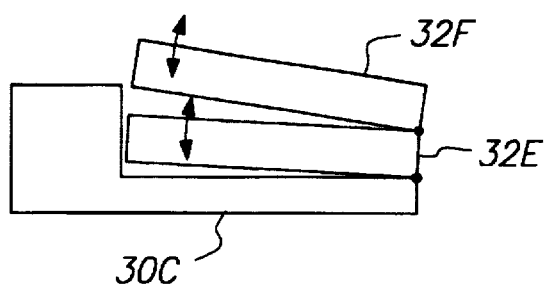

In FIG. 10 there is shown an arrangement wherein a lower subchassis 32E is hinged to the main chassis 30C, and an upper subchassis 32F is hinged to the lower subchassis 32E.

It will be appreciated that the present invention enables the operational components of a computer to be quickly and easily folded to an out-of-the-way position to provide access to at least one other component (such as the motherboard) located therebelow. Hence, the computer can be easily reconfigured, e.g., by replacement of the motherboard, without having to individually remove a large number of components and/or fasteners.

By arranging the subchassis to rotate about a horizontal hinge axis (as opposed for example, to a vertical hinge axis), the subchassis can sit upon (i.e. apply its weight to) edges 47, 60 of the main chassis for creating a more effective EMI shield between the main chassis 30 and the subchassis 32.

The provision of a support stand 70 enables the subchassis to be supported in the folded-out position. The latches 86 and/or 86A serve to retain the subchassis in the folded-in position.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. An electrical appliance comprising a chassis which includes a main chassis section supporting at least a removable first electric operational component of the appliance, and a subchassis supporting at least a second electric operational component of the appliance, said subchassis being hingedly mounted for swinging movement relative to said main chassis section and relative to said first operational component about a substantially horizontal axis of rotation between a folded-in position arranged above said first operational component and blocking access thereto, and a folded-out position offset from said first operational component to provide access thereto, said appliance further including a removable cover arranged to prevent removal of said second operational component when said subchassis is in said folded-in position, said cover being removable when said subchassis is in said folded-in position, said second operational component being removably mounted on said subchassis so as to be accessible for removal when said subchassis is in said folded-in position and said cover is removed, said subchassis covering said first operational component when in said folded-in position and exposing said first operational component for removal when in said foldedout position.

2. The appliance according to claim 1, wherein said main chassis section forms an internal space, said subchassis disposed within said space when in said foldedin position, and disposed out of said space when in said folded-out position.

3. The appliance according to claim 1, wherein said main chassis section is formed of metal.

4. The appliance according to claim 3, wherein said subchassis is formed of metal.

5. The appliance according to claim 1, further including a swingable supporting leg mounted on said subchassis for movement relative to said subchassis to a storage position when said subchassis is in said folded-in position, and to a supporting position for supporting said subchassis when said subchassis is in said folded-out position.

6. The appliance according to claim 1, wherein said main chassis section includes at least one horizontal edge upon which said subchassis sits when in said foldedin position.

7. The appliance according to claim 1, wherein there are at least two subchasses, each hinged about a respective substantially horizontal axis.

8. The appliance according to claim 7, wherein each subchassis is hinged to said main chassis, and said subchasses are arranged in side-by-side relationship when in their folded-in positions.

9. The appliance according to claim 7, wherein said subchasses are arranged one above the other when in their folded-in positions.

10. The appliance according to claim 1 further including at least one releasable latch for retaining said subchassis in its folded-in position.

11. The appliance according to claim 1, wherein said subchassis extends completely from a front end to a rear end of said main chassis.

12. The appliance according to claim 1, wherein said subchassis carries a power supply defining said second operational component, said first operational component comprising a motherboard.

13. The appliance according to claim 1, wherein said subchassis carries at least one disk drive, said first operational component comprising a motherboard.

14. The appliance according to claim 1, wherein said subchassis includes a floor having a hole formed therethrough, a power supply mounted on said floor and including an electrical cable extending through said hole, a motherboard disposed beneath said floor when said subchassis is in said folded-in position, said motherboard being electrically coupled to said cable.

15. The appliance according to claim 1 wherein said subchassis forms a floor for said second operational component; said floor lying under said second operational component and over said first operational component when said subchassis is in said folded-in position.

16. An electrical appliance comprising a chassis which includes a main chassis section supporting at least a first electric operational component of the appliance, and a subchassis supporting at least a second electric operational component of the appliance, said subchassis being hingedly mounted for swinging movement relative to said main chassis section about a substantially horizontal axis of rotation between a folded-in position arranged above said first operational component and blocking access thereto, and a folded-out position offset from said first operational component to provide access thereto, said subchassis including a floor having a hole formed therethrough, a power supply mounted on said floor and including an electrical cable extending through said hole, a motherboard disposed beneath said floor when said subchassis is in said folded-in position, said motherboard being electrically coupled to said cable.

17. The appliance according to claim 1 further including a housing removably mounted externally on said chassis, said cover comprising a portion of said housing.

18. The appliance according to claim 1 wherein said cover overlies a top of said subchassis when said subchassis is in said folded-in position.

19. The appliance according to claim 1 wherein said cover comprises a metal plate.

20. An electrical appliance comprising a chassis which includes a main chassis section supporting at least a removable first electric operational component of the appliance, and a subchassis supporting at least a second electric operational component of the appliance, said subchassis being hingedly mounted for swinging movement relative to said main chassis section and relative to said first operational component about a substantially horizontal axis of rotation between a folded-in position arranged above said first operational component and blocking access thereto, and a folded-out position offset from said first operational component to provide access thereto, said second operational component being removably mounted on said subchassis so as to be accessible for removal when said subchassis is in said folded-in position, said subchassis covering said first operational component when in said folded-in position and exposing said first operational component for removal when in said folded-out position, said subchassis forming a floor lying under said second operational component and over said first operational component when said subchassis is in said folded-in position.

* * * * *